(12) United States Patent
Grapov et al.

(10) Patent No.: US 7,653,116 B2
(45) Date of Patent: Jan. 26, 2010

(54) PORTABLE LASER HEAD

(75) Inventors: Yuri Grapov, Sutton, MA (US);
William D. Jones, Wrentham, MA (US);
Stephen J. Kasik, Jr., Webster, MA (US); Rene J. Lyman, Sutton, MA (US)

(73) Assignee: IPG Photonics Corporation, Oxford, MA (US)

( * ) Notice: Subject to any disclaimer, the term of this patent is extended or adjusted under 35 U.S.C. 154(b) by 190 days.

(21) Appl. No.: 12/072,596

(22) Filed: Feb. 27, 2008

(65) Prior Publication Data
US 2009/0213894 A1 Aug. 27, 2009

(51) Int. Cl.
*H01S 3/08* (2006.01)
(52) U.S. Cl. ..................... 372/107; 372/108
(58) Field of Classification Search ............. 372/54, 372/55, 108, 99; 356/301
See application file for complete search history.

(56) References Cited

U.S. PATENT DOCUMENTS

| | | | | |
|---|---|---|---|---|
| 3,919,663 A | * | 11/1975 | Caruolo et al. | 372/107 |
| 4,731,795 A | * | 3/1988 | Clark et al. | 372/107 |
| 5,042,048 A | * | 8/1991 | Meyer | 372/108 |
| 5,283,802 A | * | 2/1994 | Hsiung | 372/107 |
| 5,561,684 A | * | 10/1996 | Martin | 372/107 |
| 5,640,411 A | * | 6/1997 | Bochum et al. | 372/64 |
| 5,642,448 A | | 6/1997 | Pan et al. | |
| 5,818,579 A | * | 10/1998 | Beck et al. | 356/301 |
| 5,822,478 A | | 10/1998 | Kim | |
| 5,841,591 A | | 11/1998 | Zhu | |
| 6,168,319 B1 | | 1/2001 | Francis | |

* cited by examiner

*Primary Examiner*—Minsun Harvey
*Assistant Examiner*—Tuan N. Nguyen
(74) *Attorney, Agent, or Firm*—Y. Kateshov

(57) ABSTRACT

A portable laser head has a single-piece holder configured with a plurality of spaced-apart nests. The nests are arranged to receive at least a non-linear frequency converter, a V-shaped beam splitter and a dump collimator. Alternatively, the holder has multiple nests configured to receive an input collimator and output focusing optics unit in addition to the non-linear frequency converter, V-shaped beam splitter and dump collimator. The holder is characterized by small dimensions allowing for self-alignment of the above-referred components.

17 Claims, 9 Drawing Sheets

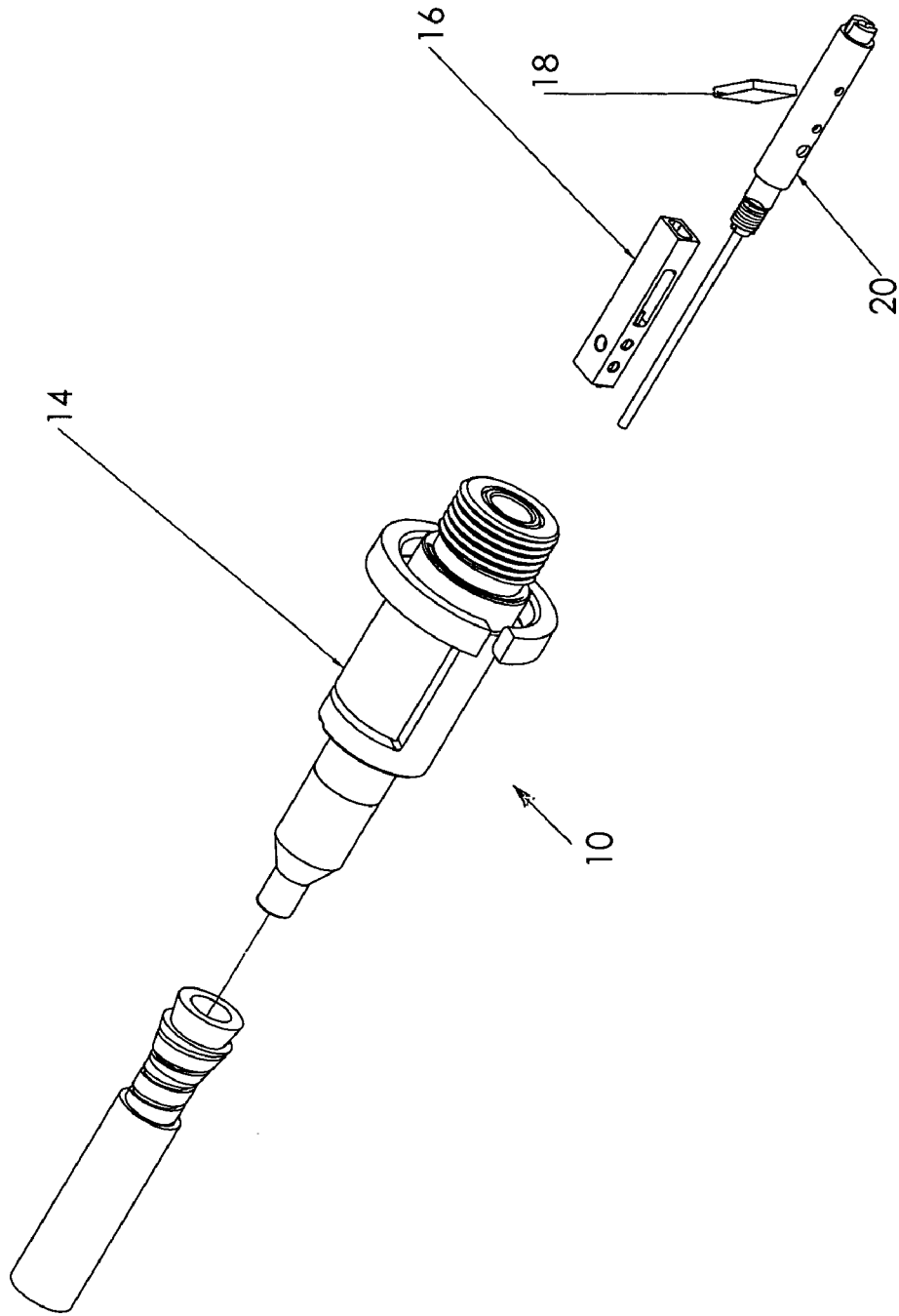

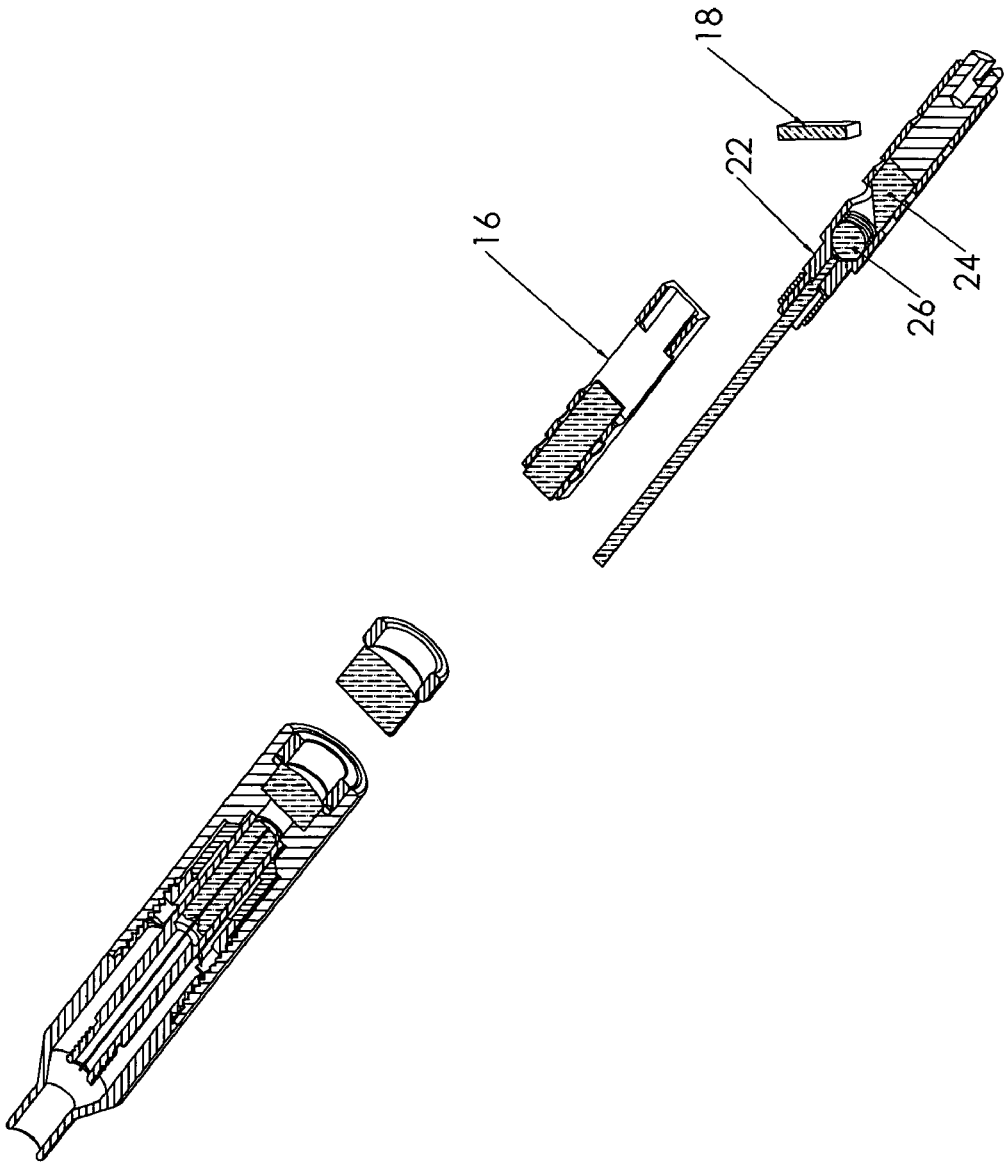

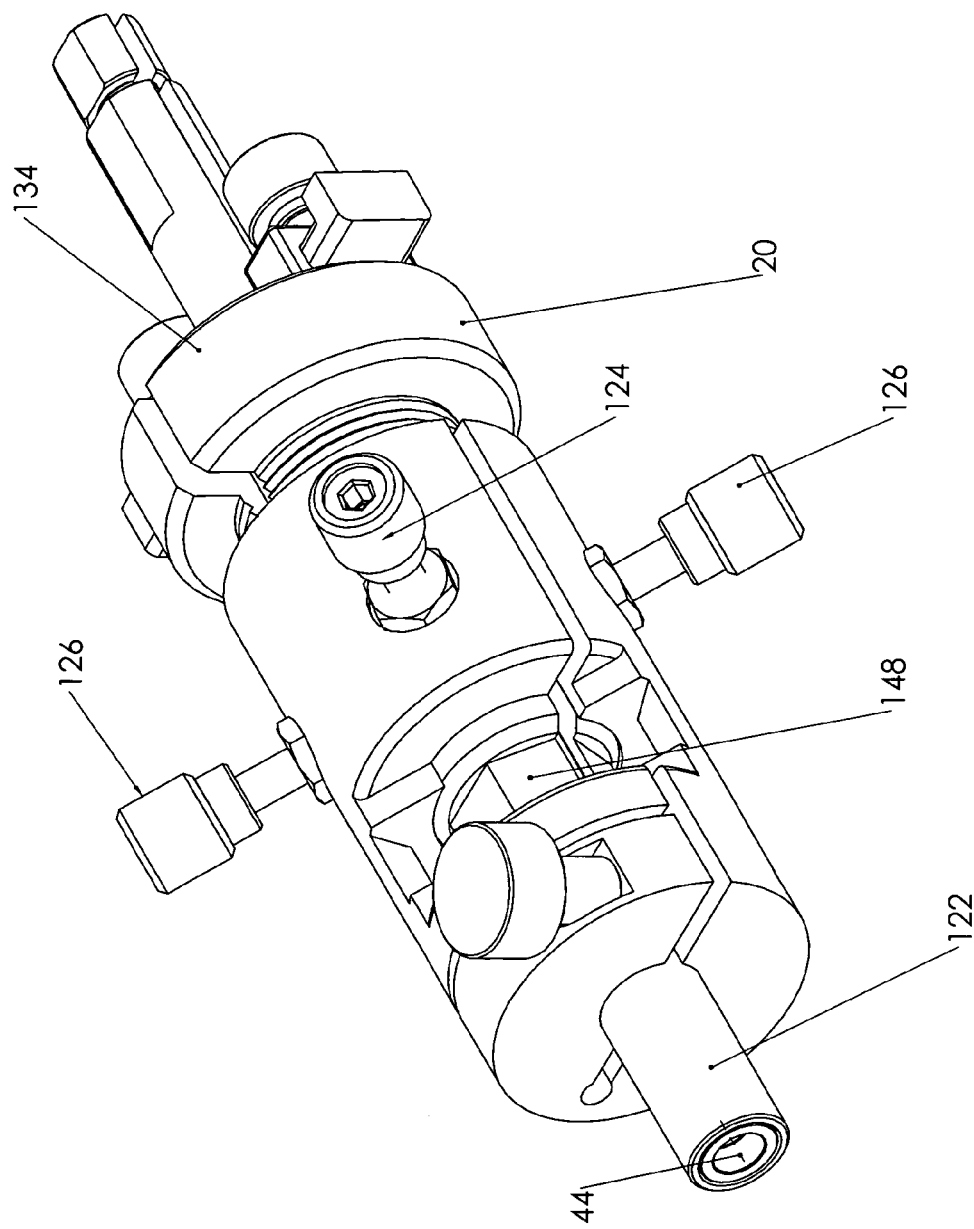

PORTABLE LASER HEAD

BACKGROUND OF THE INVENTION

1. Field of the Invention

The invention relates to lasers and, more particularly, to a configuration of portable laser head.

2. Prior Art Discussion

The trend towards compactness, ruggedness, structural simplicity and reliability has been accompanying development of lasers since the inception of the laser industry. Portable or hand-held low-power laser heads are typically, but not necessarily, associated with lasers capable of generating light at wavelengths in visible spectrum, such as green, yellow and others, and near infra-red ranges.

FIG. 1 shows an exploded view of a rather typical portable laser head 10. A light source emits, for example, a near IR light coupled to and guided along a fiber which is enclosed in a housing 14. The fiber is held in an input collimator assembly aligned to the housing 14. As known to one of ordinary skills in the laser arts, a typical collimator assembly includes a fiber, a glass tube or capillary holding the exposed fiber end, and a lens, such as a graded-index (GRIN) lens. The light exiting the fiber end is collimated by a GRIN before it enters a frequency converter holder 16. The holder 16 is configured to house a nonlinear optical element, such as a crystal, operative to convert the collimated input light to light of other desirable frequencies. The frequency conversion rate is not high. As a consequence, the output light exiting the crystal carries desirable and undesirable wavelengths when it impinges upon a beam splitter 18 located outside the housing of holder 16 along a light path. To transmit light at the desired wavelength and reflect light at undesired wavelengths, the surface of beam splitter 18 has a coating.

One of the requirements to be met by laser head 10 includes a compact configuration. Mounting beam splitter 18 outside crystal holder 16 contributes to enlarging the overall configuration of the laser head.

Returning to the configuration of splitter 18, the reflected light adds to the heating of laser head 10 and has to be evacuated therefrom. A dump collimator assembly or unit 20, shown in FIG. 1, is operative to remove the reflected light from laser head 10.

Turning to FIG. 1A, dump collimator assembly 20 receives the reflected light from beam splitter 18. The dump collimator assembly 20 includes a dump collimator 22 which is mounted inside crystal holder 16. The dump collimator 22 is configured with a 45° mirror 24 training the light, which is reflected from splitter 18, at a ball lens 26 which focuses the light so that it enters an output fiber guiding the reflected light outside laser head 10.

The combination of beam splitter 18 and mirror 24 poses a few problems. One of the problems relates to adjustment of beam splitter 18 relative to crystal holder 16. The other problem stems from difficulties experienced during alignment of beam splitter mirror 18 and mirror 24.

It is, therefore, desirable to provide a portable laser head having a crystal holder configured so as to house a beam splitter and a dump collimator.

It is also desirable to provide a portable laser head configured so that a beam splitter and a mirror of dump collimator are mounted in a crystal holder in a fixed spatial relationship relative to one another.

It is further desirable to provide a portable laser head which is relatively inexpensive and compact.

SUMMARY OF THE INVENTION

The above and other objectives are met by the present disclosure. A portable laser head configured in accordance with the disclosure is compact, hermetically sealed, and has a simple structure allowing for a time- and cost-effective mass production of the disclosed laser head.

In accordance with one aspect of the disclosure, the disclosed portable laser head is provided with an input collimator assembly having input focusing optics, and an output collimator assembly detachably coupled to the input collimator assembly. The output collimator assembly includes a crystal holder configured to house a nonlinear component, a beam splitter and a dump collimator. As a result, the overall configuration of the laser head is more compact than that one of the known prior art laser heads. The small distance between a non-linear component housed in the crystal holder and splitter allows for self alignment of these elements.

In accordance with one aspect of the disclosure, the disclosed portable laser head is provided with an input collimator assembly having input focusing optics, and an output collimator assembly detachably coupled to the input collimator assembly. The output collimator assembly includes a crystal holder configured to house a nonlinear component, a beam splitter and a dump collimator. As a result, the overall configuration of the laser head is more compact than that one of the known prior art. The small distance between a non-linear component housed in the crystal holder and splitter allows for self alignment of these elements.

In accordance with a further aspect of the disclosure, a beam splitter and a mirror of dump collimator, which is housed in the crystal holder, are configured as a one-piece component. This component, thus, has two reflecting elements extending at a predetermined angle relative to one another. The one-piece component eliminates the necessity of tedious alignment between the beam splitter and mirror of the dump collimator.

The above and other features and advantages of the disclosed laser head will be disclosed in detail hereinafter in conjunction with the following accompanying drawings.

BRIEF DESCRIPTION OF THE DRAWINGS

FIG. 1 is an exploded view of laser head configured in accordance with the known prior art.

FIG. 1A is a sectional view of the laser head of FIG. 1.

FIG. 8 is an elevated side view of tool of FIG. 7.

SPECIFIC DESCRIPTION

Figure 2:
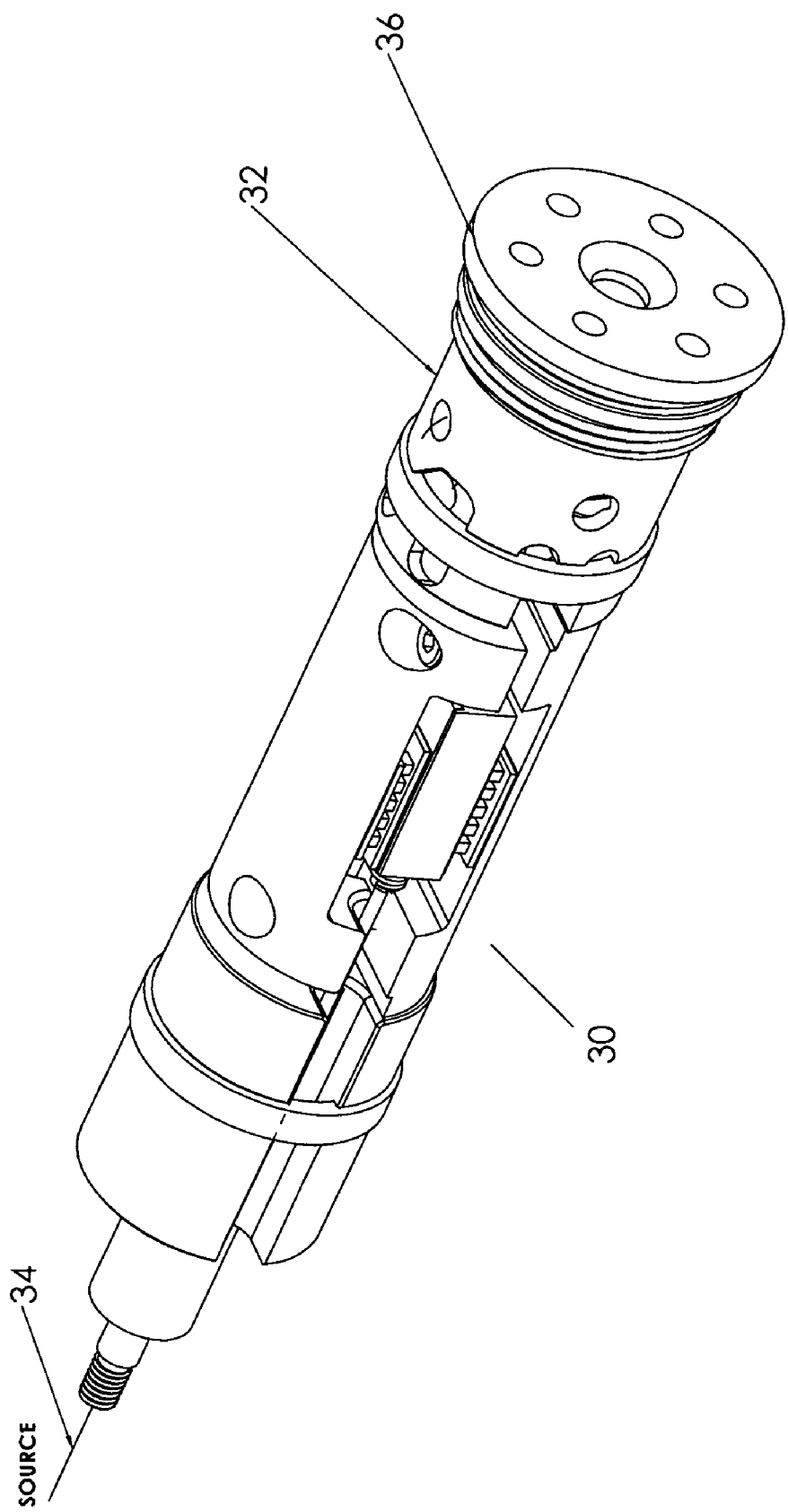
FIG. 2 is an orthogonal view of one of the embodiments of the disclosed laser head.

Reference will now be made in detail to the disclosed system. Wherever possible, same or similar reference numerals are used in the drawings and the description to refer to the same or like parts or steps. The drawings are in simplified form and are far from precise scale. For purposes of convenience and clarity only, the terms "connect," "couple," and similar terms with their inflectional morphemes do not necessarily denote direct and immediate connections, but also include connections through mediate elements or devices.

FIG. 2 illustrates one of the embodiments of a portable laser head 30 configured with a housing 32. The housing 32 encloses a combination of light guide components operative to transmit light from a light source 34 to an output 36 of laser head 30. Given only as an example, light source 34 is configured to generate light at near infra-red frequencies. The laser head 30 is capable of outputting, for example, green or yellow light having an output power of about 2 to 5 watts.

Figure 3:
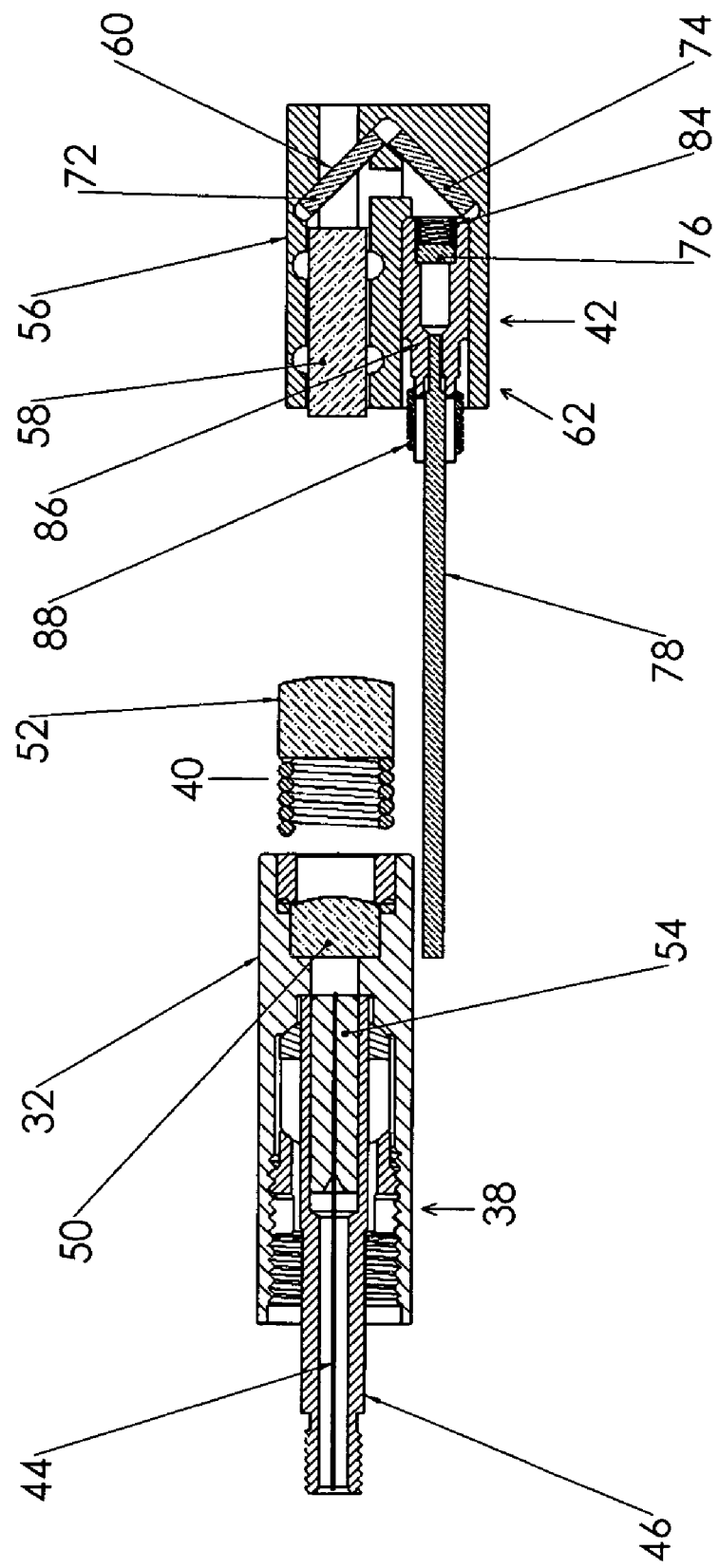
FIG. 3 is an exploded cross-sectional view of the embodiment of the disclosed laser head shown in FIG. 2.

Turning now to FIG. 3 in addition to FIG. 2, the light guide components can be generally grouped in three major units including an input collimator unit 38, a focusing lens connecting unit 40 and an output collimator unit 42. The light from light source 34 (FIG. 2) is coupled to an input fiber 44 which is preferably, but not necessarily, is a single mode fiber. The input fiber 44 is mounted to an input collimator 46 which can be easily aligned to housing 32, as will be disclosed hereinafter, so that the light exiting the distal end of input fiber 44 properly impinges upon a graded-index (GRIN) lens 50. The GRIN lens 50 collimates the light diverging from the smaller core of input fiber 44 and focuses this light to a focusing lens 52, which is mounted inside connecting unit 40 mechanically and optically coupling input and output collimator units 38 and 42, respectively.

The output collimator unit 42 includes a holder 56 encasing a non-linear frequency converter component 58, a beam splitter component 60 and a dump collimator assembly 62. The light focused by focusing lens 52 is coupled to frequency converter 58, which is aligned with input fiber 44 along a light path and operative to convert the entering light to the desired frequencies. Typically, not all coupled light is converted. In fact, a relatively small portion of the entered light exits frequency converter 58 at the desired frequency; the rest of the light propagates through the converter at the initial frequency. The nonlinear converter 58 may be configured, among others, as a crystal or fiber. The light with the desired frequency has to propagate along the light path towards output 36 (FIG. 2) of laser head 30, whereas the unconverted light should be removed from holder 56 and further from laser head 30 in order to prevent forbiddingly elevated temperatures inside laser head 30. The separation of the desired from undesired frequencies is realized by beam splitter component 60.

Figure 4:
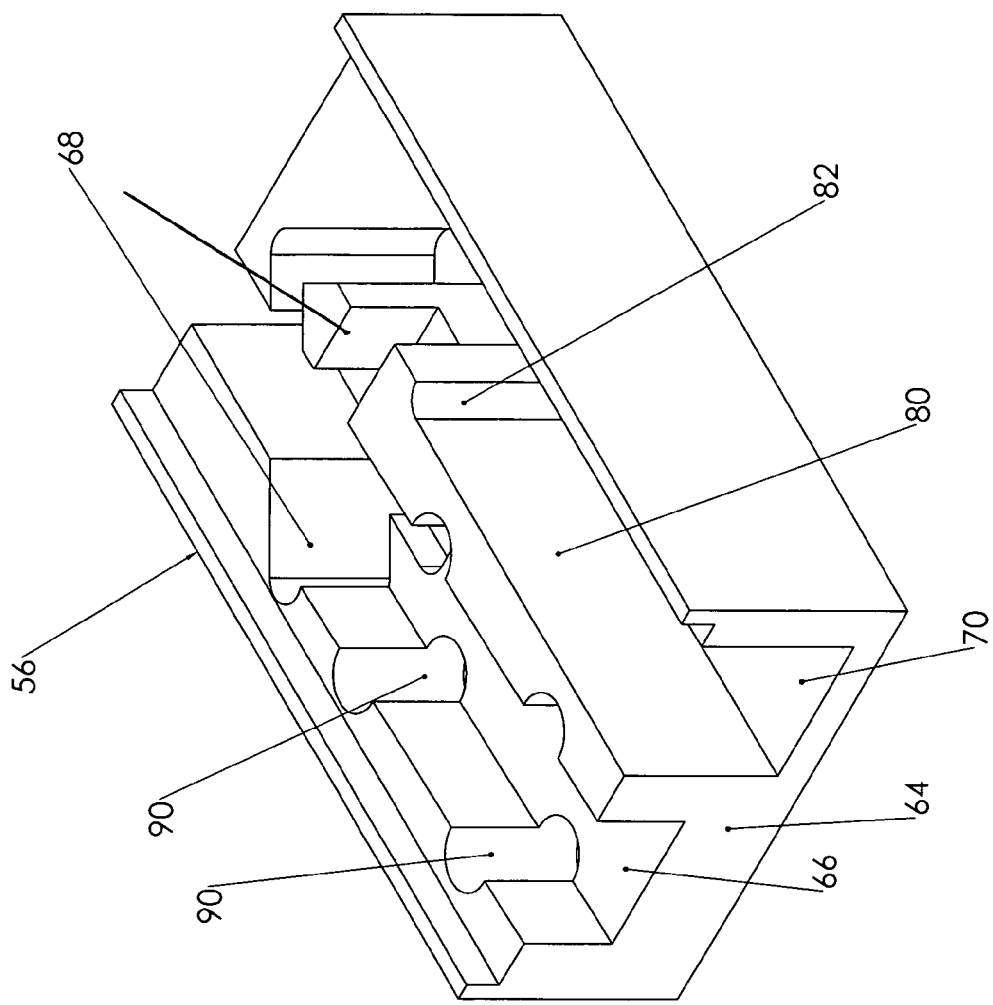
FIG. 4 is an orthogonal view of a crystal holder configured in accordance with the present disclosure and structured to be utilized in the structure of the embodiment of FIG. 3.

Turning to FIG. 4 in addition to FIGS. 2 and 3, the configuration of holder 56 includes a body 64 milled to have multiple nests which are configured to receive respective components. For example, a nest 66 is structured to receive non-linear frequency converter 58 (FIG. 3). A further nest 70, extending, preferably, but not necessarily, in a plane substantially parallel to the plane of nest 66, is shaped and dimensioned to receive dump collimator 62 (FIG.3). Juxtaposed with the distal ends of respective nests 66 and 70 is an angled-shaped nest 68 configured to receive beam splitter component 60. The nest 68 may have, for example, a V-shaped or U-shaped cross-section. Accordingly, in contrast to the known prior art, beam splitter 72 (FIG. 3) is fully incorporated within holder 56 which leads to a substantially reduced size of the holder and laser head 30.

Returning to FIG. 3, beam splitter component 60 is configured as a one-piece component having beam splitter 72 and mirror 74 each of which is received in its own bed of angled nest 68 (FIG. 4). The beam splitter 72 has its surface coated with a material well known to one of ordinary skills in the art and operative to transmit the desired light frequency toward output 36 of laser head 30 (FIG. 2) while reflecting the undesired light to mirror 74. The beam splitter and mirror 72 and 74, respectively, are, thus, mounted to holder 56 in a fixed spatial relationship relative to one another and, as a consequence, do not require additional alignment operations so time consuming in the known prior art. Alternatively, beam splitter and mirror 72 and 74, respectively, can be two separate components which, when mounted to angled nest 68 (FIG. 4) invariably assume the desired spatial position relative to one another.

The mirror 74 of beam splitter component 60 trains the reflected beam of the undesirable Light to dump collimator 62 including a GRIN lens 76. The lens 76 couples the reflected light to an output fiber 78 guiding it towards the input end of laser head 30, where the unconverted light is evacuated from head's housing 32 (FIG. 2). The beam of light trained by portion 74 should be preferably focused to the desired spot size at a predetermined distance between portion 74 of beam splitter component 60 and lens 76 of dump collimator assembly 62. Turning briefly to FIG. 4, nest 70 is defined by a partition 80 separating nests 66 and 70 and having a rounded flange 82 which is configured to stop axial displacement of dump collimator 62 at the predetermined distance from mirror 74 of beam collimator component 60. To provide structural stability of the dump collimator during the use of laser head 30, lens 76 is held in place by a spiral spring 84 (FIG. 3). A fiber tube receiving the end of dump fiber 78 is pressed upon by a dump collimator housing 86 in response to a spring action exerted by a further spiral spring 88 which surrounds housing 86. The fully assembled holder 60 is further treated with an adhesive material filling cavities 90 (FIG. 4), which are strategically milled in the walls of the holder, and providing additional stability and sealing qualities to the assembled holder.

Figure 5:
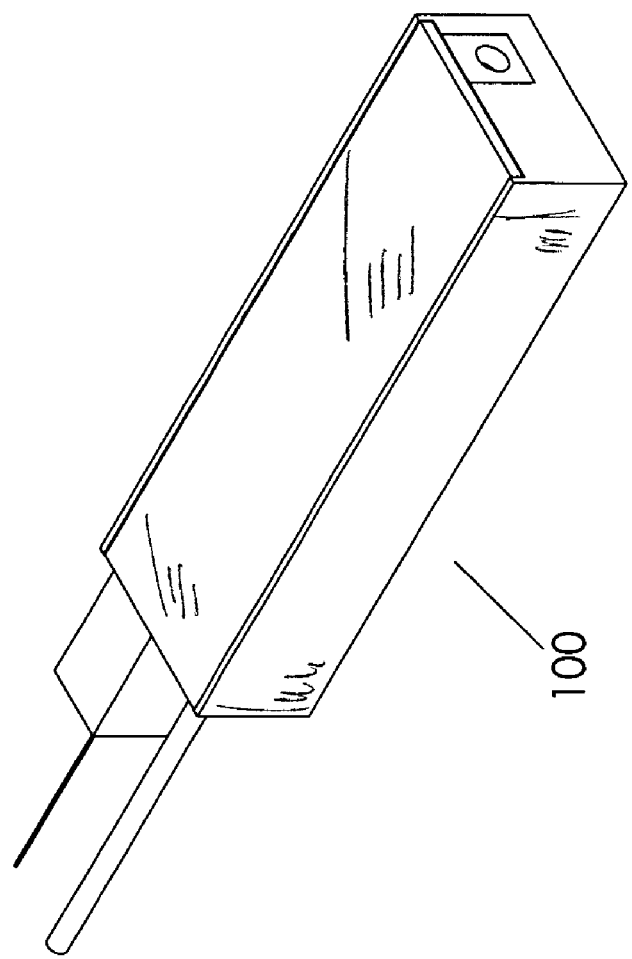
FIG. 5 is a perspective view of a laser head configured in accordance with a further embodiment of the disclosure.
Figure 6:
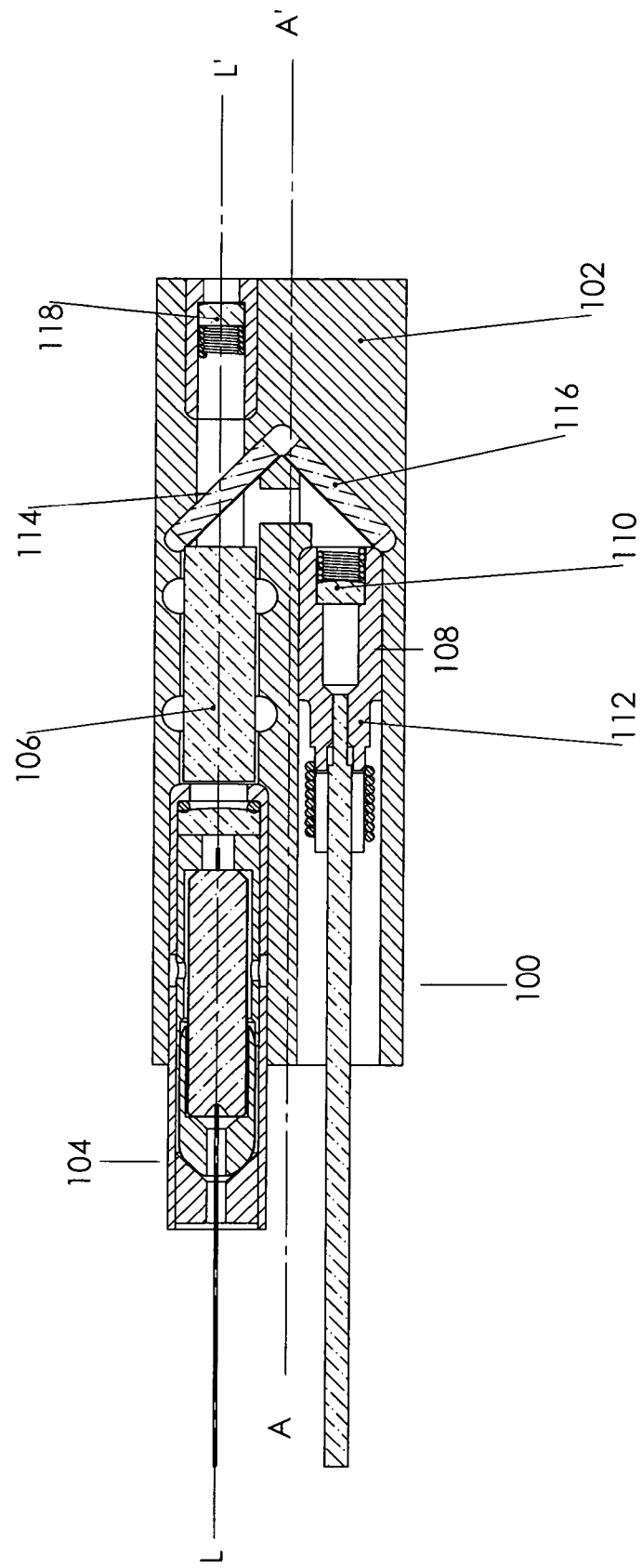
FIG. 6 is an axial sectional view of the laser head of FIG. 5.

FIGS. 5 and 6 illustrate a further embodiment of disclosed portable laser head 100. The laser head 100 is a miniature device shown in actual size in FIG. 5. The laser head 100 may be thus about 4-5 cm long, about 1 cm wide and about 0.5 cm thick. Furthermore, it may be fully encapsulated to exhibit excellent liquid-sealing capabilities and manufactured as a chip.

Turning specifically to FIG. 6, portable laser head 100 is configured with a holder 102 milled with a plurality of nests which are shaped and dimensioned to receive respective components of the laser head. Similar to the embodiment of FIGS. 2-4, holder 102 houses a conversion media component 106 operative to convert input light to the desired frequency and received in a nest which extends parallel to a longitudinal axis A-A' of holder 102. A dump collimator assembly 108, which includes a dump lens 110 and fiber tube 112 surrounding a dump fiber for guiding the unconverted light out of laser head 100, is received in a respective nest extending substantially generally parallel to longitudinal axis A-A'.

The laser head 100, like laser head 30 of FIGS. 2-4, has an angled nest receiving a beam splitter component which includes a beam splitter 114 and a dump mirror 116 spatially fixed relative to splitter 114. The splitter 114 and dump mirror 116 may be configured as a one-piece body, or alternatively, as two separate elements coupled to one another. Preferably, beam splitter 114 and dump mirror 116 diverge from one another towards the input of laser head 100 at about 45° angle so that beam splitter 114 is practically self-aligned with conversion media component 106, whereas dump mirror is self-aligned with dump lens 110.

In accordance with a further aspect of the embodiment shown in FIGS. 5 and 6, holder 102 is further configured to receive an input collimator assembly 104. The input collimator assembly 104 is received in a nest milled within holder 102 and aligned with the nest for conversion media component 106 along a light path L-L'. Furthermore, an output collimating lens 118 is also received within holder 102.

According to still a further aspect of the disclosure, output collimating lens 118 is also mounted to holder 102 downstream from beam splitter 114 in a transmission direction so that output lens 118, beam splitter 114, nonlinear component 106 and input collimator assembly 104 are all aligned with one another. Accordingly, all optical components of laser head 100 are received in single holder 102 and spaced apart from one another at so small respective distances that no additional alignment procedures are necessary.

Figure 7:
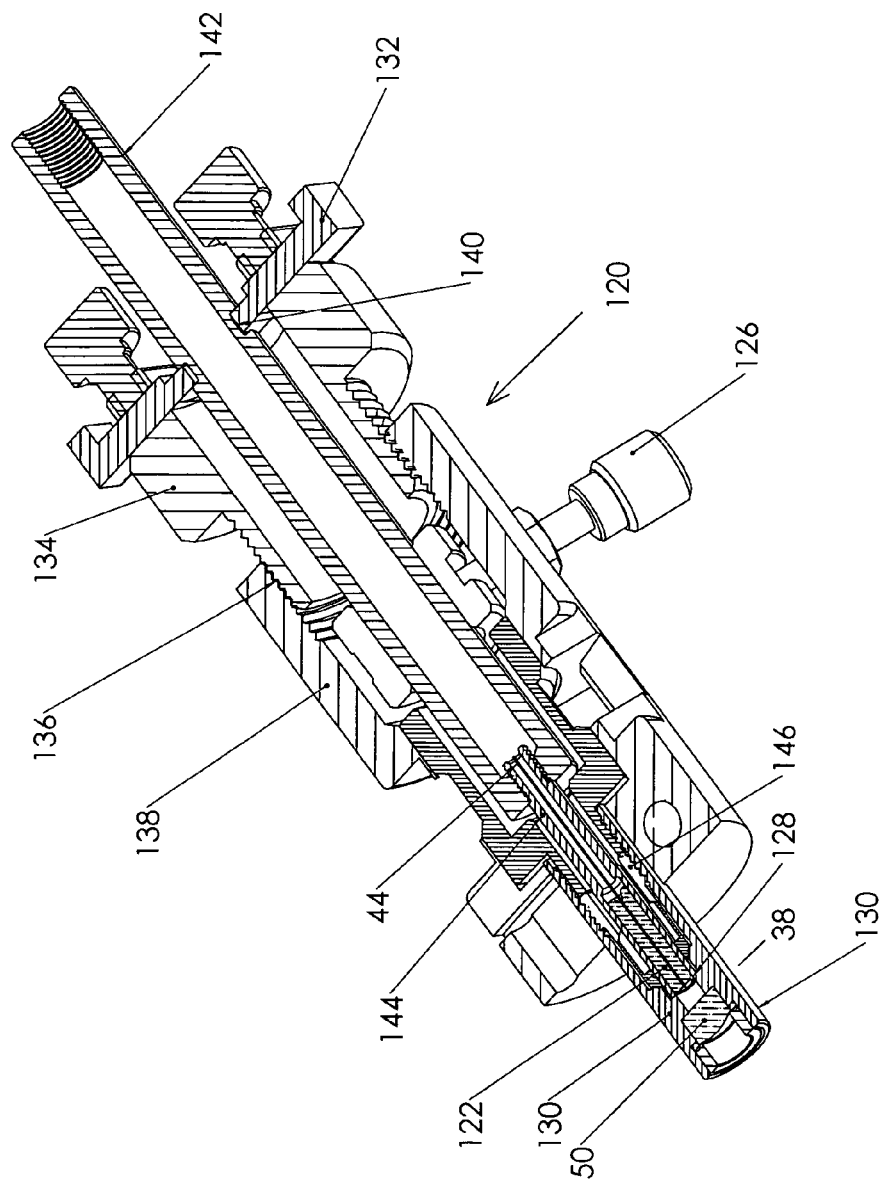
FIG. 7 is an axial sectional view of the input collimator assembly of FIG. 3 and a tool unit for aligning the input fiber with a collimator lens.

FIGS. 7 and 8 illustrate a further aspect of the disclosure including a position-adjustment tool 120 for aligning input fiber 44 with GRIN lens 50 within input collimator assembly 38. Thus, the scope of the disclosure envisions manufacturing a kit including laser head 30 as shown in FIGS. 2-4 and a tool 120 (FIG. 8) operative to provide an easy alignment or tuning of the input collimator at place.

The input fiber 44 is held in a cylindrical ferrule 122 of input collimator assembly 38 such that the ferrule and fiber are displaceably fixed to one another. The position of the distal end of fiber 44 and GRIN lens 50 is important for collimation. The relative position between the lens and ferrule can be adjusted in X-Y-Z coordinates by utilizing tool 120. The tool 120, as shown in FIG. 7 has a cylindrical cross-section and is provided with a mechanism for X-Y displacement between ferrule 122 and lens 50. In particular, when input collimator assembly 38 is inserted within the body of tool 120, the operator may utilize levers 124, 126 (FIGS. 7 and 8) so as to pivot ferrule 122 in a rounded seat 128 provided in a case 130 of collimator assembly 38. When the angular position of the fiber end and lens 50 is found satisfactory, the operator displaces lugs 132 (FIG. 7), which are provided on a cylindrical nut 134 that threadedly engages an inner surface 136 of tool housing 138, radially inwards. The lugs 132 are received in respective channels 140 formed in a cylindrical shaft 142, which, in turn, threadedly engages a fiber jacket 144 surrounding and displaceably fixed to ferrule 122. A torque applied to nut 134 causes simultaneous linear displacement of fiber jacket 144, ferrule 122 and the fiber end relative to lens 50 along a Z axis. Having achieved the desirable spot size of the input light, the operator can tighten up locking screws 146 by placing an external tool into a recess 148 (FIG. 8) which pushes locking screw 146 toward lens 50. As locking screw 146 (FIG. 7) axially moves, it urges ferrule 122 axially towards rounded seat 128 while simultaneously applying a radial compressing force to fiber jacket 144. As a result a fixed spatial position between the fiber end and lens 50 is obtained.

Although shown and disclosed is what is believed to be the most practical and preferred embodiments, it is apparent that departures from the disclosed configurations and methods will suggest themselves to those skilled in the art and may be used without departing from the spirit and scope of the invention. Accordingly, the present invention is not restricted to the particular constructions described and illustrated in regard to, for example, green or yellows lasers, but should be construed to cohere with all modifications that may fall within the scope of the appended claims.

The invention claimed is:

1. A holder for use with a portable laser head, comprising: body configured with a plurality of nests;
    a frequency converter mounted to the body and operative to convert an energy of an input light in a first frequency band to an output light in the first frequency band and a second frequency band different from the first frequency band;
    a beam splitter aligned with the frequency converter and mounted to the body, the beam splitter being configured to transmit the output light in the second frequency band along a transmission path and reflect the output light in the first frequency band,
    a mirror mounted to the body and configured to receive the output light in the second frequency band from the beam splitter, the beam splitter and mirror being spatially fixed relative to one another upon mounting to the body; and
    a dump collimator operative to receive the reflected light from the mirror so as to guide the reflected light from the body along a reverse light path not coinciding with the transmission path of the input light, the plurality of nests being configured to receive respective frequency converter, beam-splitter and mirror and the dump collimator.

2. The holder of claim 1, wherein the plurality of nests are configured so that the frequency converter and beam splitter are self-aligned along the transmission path of the input light in the body, the nest for the beam splitter and mirror having an angled-shaped cross-section and being configured so that the dump collimator and mirror are self aligned along the reverse light path in the body.

3. The holder of claim 2, wherein the beam splitter and mirror arc configured as a one-piece body having a V- or U-shaped cross-section.

4. The holder of claim 2, wherein the beam splitter and mirror are separate components.

5. The holder of claim 2, wherein the nests are arranged so that the input and reflected lights propagate in opposite directions along the respective transmission and reverse light paths.

6. The holder of claim 2 further comprising an input collimator receiving and guiding the input light along the transmission path towards the frequency converter.

7. The holder of claim 6 further comprising an output focusing optics located downstream from the beam splitter along the transmission path, the input collimator and output focusing optics being received in respective nests of the plurality of nests provided in the body.

8. A portable laser head comprising;
    a holder provided with a plurality of spaced-apart nests;
    a non-linear frequency converter mounted in one of the nests and operative to convert an input light in a first frequency band to an output light in the first frequency band and in a second frequency band different from the first frequency band;
    a beam splitter received in a respective one of the nests downstream from the frequency converter along a first light path, the beam splitter being configured to transmit the light in the second frequency band along the first light path and reflect the light in the first frequency band along a second light path different from the first path;
    a mirror received in a respective one of the nests and located downstream from the beam splitter along the second light path, the mirror being configured to receive the reflected light in the first frequency band from the beam splitter;
    a dump reflector mounted to a respective one of the nests of the holder downstream from the mirror along the second path and aligned with the mirror so as to guide the reflected light in the first frequency band along the second light path outside the laser head;

an input collimator located upstream from the non-linear frequency converter along the first transmission path; and an output focusing optics unit located downstream from the beam splitter along the first path, wherein the input collimator, frequency converter, beam splitter and output focusing unit being aligned along the first path.

9. The portable laser head of claim 8 further comprising a housing enclosing the bolder.

10. The portable laser head of claim 8, wherein the input collimator and output focusing optics unit are received in respective nests of the holder.

11. The portable laser head of claim 10 further comprising an input optical focusing unit located along the first path between the input collimator and the holder and removably coupled thereto.

12. The portable laser head of claims 8, wherein the input collimator and output focusing optics unit are spaced from the holder.

13. The portable laser head of claim 8, wherein the beam splitter and mirror are coupled to one another to define a V- or U-shaped unit.

14. The portable laser head of claim 8, wherein the mirror and dump collimator are aligned along the second path extending substantially parallel to the first path.

15. A kit comprising:
an elongated laser head having a longitudinal axis and provided with:
an input collimator unit provided with concentrically arranged outer fiber jacket and an inner ferrule, which is configured to hold an input fiber, and a collimator lens spaced axially from (he fiber jacket and operative to focus an input light coupled to the input fiber along a transmission light path, an output unit downstream from and coupled to the input collimator unit, the output unit being having a oncepiece holder receiving a frequency converter and beam splitter aligned with the collimator lens, a mirror extending angularly from and spatially fixed to the beam splitter, and a dump collimator assembly aligned with the mirror, and a housing receiving the input collimator and output units and having an interior with a seat for supporting a distal end of the fiber jacket of the input collimator unit; and an alignment tool removably coupled to the housing and operative to displace the inner ferrule and the collimator lens relative to one another along X-Y-Z axes to a desired position between the ferrule and collimator lens, the alignment tool comprising: a shaft provided with an inner thread meshing with an outer thread on the ferrule jacket for displacing the inner ferrule relative the collimator lens along the Z-axis, and a case surrounding the shaft and coupled thereto so that the ferrule jacket pivots within the seat of the housing along the X-Y axes.

16. The kit of claim 15, the adjustment tool further has a plurality of lugs displaceable transversely to the longitudinal axis and engaging respective recesses in the shaft to prevent voluntary displacement between the alignment tool and the output collimator unit along the Z-axis, and multiple angularly spaced arms mounted on the case and displaceable transversely to the longitudinal axis so as to selectively engage and displace the case with the ferrule jacket along the X-Y axes to the desirable position.

17. The kit of claim 15, wherein the adjustment tool further has a plurality of locking screws and an outer nut threadedly engaging and axially displacing the locking screws so as to displaceably fix the input collimator unit to the housing upon establishing the desired position of the fiber relative to the collimator lens.

* * * * *